United States Patent [19]

Van Allen et al.

[11] 4,285,589
[45] Aug. 25, 1981

[54] SWITCH CONTROL FOR CAMERA FLASH UNIT

[75] Inventors: David Van Allen, Malden; Fred M. Finnemore, North Reading, both of Mass.

[73] Assignee: Polaroid Corporation, Cambridge, Mass.

[21] Appl. No.: 889,248

[22] Filed: Mar. 23, 1978

[51] Int. Cl.³ .............................................. G03B 15/05
[52] U.S. Cl. .................................................. 354/145
[58] Field of Search ............................... 354/126–129, 354/135, 139, 145, 149, 288, 295; 362/3–5, 10; 200/52 R, 51.58 R

[56] References Cited

U.S. PATENT DOCUMENTS

| | | | |
|---|---|---|---|
| 3,868,700 | 2/1975 | Kuramoto | 354/288 X |
| 4,001,640 | 1/1977 | Biber | 354/145 X |
| 4,007,469 | 2/1977 | Land et al. | 354/128 X |
| 4,084,167 | 4/1978 | Iwata | 354/145 X |
| 4,085,414 | 4/1978 | Burgarella et al. | 354/145 |

Primary Examiner—L. T. Hix
Assistant Examiner—William B. Perkey
Attorney, Agent, or Firm—Edward S. Roman

[57] ABSTRACT

An electronic flash unit attachable to the top of a camera shutter housing is provided with a switch control apparatus which connects with the flash unit and is positioned on the camera so as to be readily reachable by the photographer's camera-operating hand when it is in a normal position to operate the shutter and flash switch of the camera. Engagement of the switch control apparatus by the photographer's hand effects the closing of a charging switch to apply power to the flash unit and release of the switch control apparatus automatically effects the opening of the charging switch. The shutter and flash switch can be operated by the so-positioned hand as soon as the flash unit is charged.

8 Claims, 6 Drawing Figures

SWITCH CONTROL FOR CAMERA FLASH UNIT

BACKGROUND OF THE INVENTION

1. Field of the Invention

The present invention relates to an electronic flash apparatus with a power control switch, and more particularly to an electronic flash apparatus having a manual power control switch and adapted for use with a camera wherein the control switch is positioned to be reachable by the camera-operating hand of the user when such hand is in a normal position to operate the camera.

2. Description of the Prior Art

Electronic flash units for providing artificial illumination during photographic exposures occuring under conditions of low ambient scene light intensity are well known in the art. Such electronic flash units are generally adapted to receive an external, substantially steady state, d-c battery voltage which powers a voltage converter in a conventional manner to convert the d-c voltage which may be in the order of 6 volts, to a suitable flash operating voltage. A charging current from the voltage converter is directed to a storage capacitor so as to gradually charge the storage capacitor to a d-c voltage which may be in the order of 350 volts. Means are also provided for selectively discharging the storage capacitor through a flash discharge tube to produce the photographic illuminating flash of light. An on/off switch may also be provided to control the power connection from the battery to the voltage converter. Thus, when a photographer anticipates using the electronic flash, he must initially turn on the on/off switch to power the voltage converter and thereafter wait a short period of time for the storage capacitor to become fully charged. After the storage capacitor in the electronic flash is discharged through the flash tube during a photographic exposure operation of the camera, the voltage converter will automatically operate to recharge the storage capacitor in anticipation of a subsequent photographic exposure unless the operator consciously remembers to turn off the on/off switch. Should the operator fail to consciously turn off the on/off switch and let the camera sit idle for a period of time, the voltage converter will continue to operate to maintain the charged condition of the storage capacitor thereby providing a constant current drain on the battery. A prolonged period of idleness with the on/off switch remaining on may ultimately result in the complete drainage of the battery so as to render the battery inoperative.

One approach to solving this problem has involved the use of a time-out circuit within the electronic flash so as to automatically disconnect the battery from the voltage converter if the flash is not fired within a prescribed time period. However, such a time-out circuit generally involves the use of a power transistor in series connection between the battery and voltage converter which decreases the actual power input to the voltage converter as a result of the high power losses inherent to the power transistor.

A so-called "two-button camera" having an integral flash unit built therein has been disclosed in U.S. Pat. No. 4,007,469 entitled "Photographic Apparatus", by E. H. Land, issued Feb. 8, 1977 in common assignment herewith. This two-button camera embodies a so-called "grip switch" in the base portion thereof to turn on the electronic control circuit associated with both the camera and the electronic flash when the camera is held by the user. However, electronic flash units are generally configured to be detachable from the top of the lens housing portion of the camera thereby making it inconvenient for a grip switch, which constitutes an integral part of the camera, to control the detachable electronic flash unit. Since the electronic flash unit is normally connected above the shutter housing of the camera, it has also heretofore been inconvenient to provide the electronic flash unit with its own grip switch since most cameras are not normally held above their shutter housings.

More recently, an electronic flash unit, which is attachable to a camera, and includes a switch for controlling the charge to the storage capacitor of the flash unit, has been disclosed in a copending U.S. patent application, Ser. No. 749,313 now U.S. Pat. No. 4,085,414 entitled "Electronic Grip Switch Arrangement" by J. Burgarella et al, filed Dec. 10, 1976 in common assignment herewith. The switch is operated by a laterally displaceable on-off control arm which extends from the flash unit atop the camera downwardly into engagement with the user's camera support or holding hand when such hand holds the camera in a normal operational manner. With such an arrangement, when the camera is so held by the user's support hand, the control arm and thus the switch is tripped and power is applied to the storage capacitor and when the camera is released the control arm is released and the so-applied voltage is shut off.

Although the above-described control arm-switch arrangement is useful and adequate for conserving excess current drain in charging such storage capacitor, a shortcoming thereof is that the capacitor charging circuit can be activated inadvertently in handling the camera and flash unit. Further, the control arm must be unfolded and can interfere with the facile and comfortable handling of the flash-equipped camera.

However, a battery conserving on-off storage capacitor switch for an electronic flash unit is useful and economical and there is a need and market for a storage capacitor charging switch that significantly overcomes the above prior art shortcomings.

Accordingly, it is a primary object of this invention to provide a flash unit storage capacitor charge control apparatus which is so positioned with respect to a flash unit and associated camera as to minimize the inadvertent activation of such control apparatus and thus the unintended or prolonged application of power to the storage capacitor of the flash unit by the user's picking up or supporting, in a normally expected manner, the camera and flash unit. The battery associated with such a camera and flash unit is thus conserved. Further, such charge control apparatus is readily reachable by the user's camera operating hand, when such hand is in a normal position to operate the camera.

Other objects of this invention will be in part obvious and will in part appear hereinafter. The invention accordingly comprises the mechanism and system possessing the construction, the combination of elements and the arrangement of parts which are exemplified in the following detailed disclosure.

SUMMARY OF THE INVENTION

Broadly the present invention provides an electronic flash unit for use with a camera of the type which can be held by a user in a normally expected manner and which includes a photographic switch means for operating the camera and for providing a flash-fire trigger signal at an appropriate time during a photographic exposure interval together with mounting means for fixedly and removably connecting the flash unit to the camera. The flash unit has a housing which contains a storage capacitor electrically connected to a flash discharge tube and means responsive to an applied voltage for charging the capacitor. Circuit means are also provided to respond to the trigger signal to discharge the capacitor through the discharge tube to produce an illuminating flash or light. In addition, electrical connecting means facilitate the electrical connection of the circuit means to the trigger signal provided means of the camera. Physical connecting means on the flash unit housing, are complementary to the camera connecting apparatus for facilitating the releasable fixed connection of such housing to the camera. A charging switch means which is connectable to a source of voltage, controls the application of the voltage to the capacitor charging means. A switch actuator is operatively associated with the charging switch means to control the latter. The actuator is mountable on the camera or flash unit, proximate the photographic switch means so as to be readily reachable by the camera-operating hand of the user when it is in a normal position to operate the photographic switch means. The actuator is responsive to contact with the hand so as to cause the charging switch means to apply voltage to the capacitor charging means, while the hand being in potential engaging proximity with the photographic switch means to operate the same and thus the camera and flash unit.

BRIEF DESCRIPTION OF THE DRAWINGS

The invention will become more apparent from the following detailed specification and drawings in which.

DETAILED DESCRIPTION OF THE DRAWINGS

Figure 1:
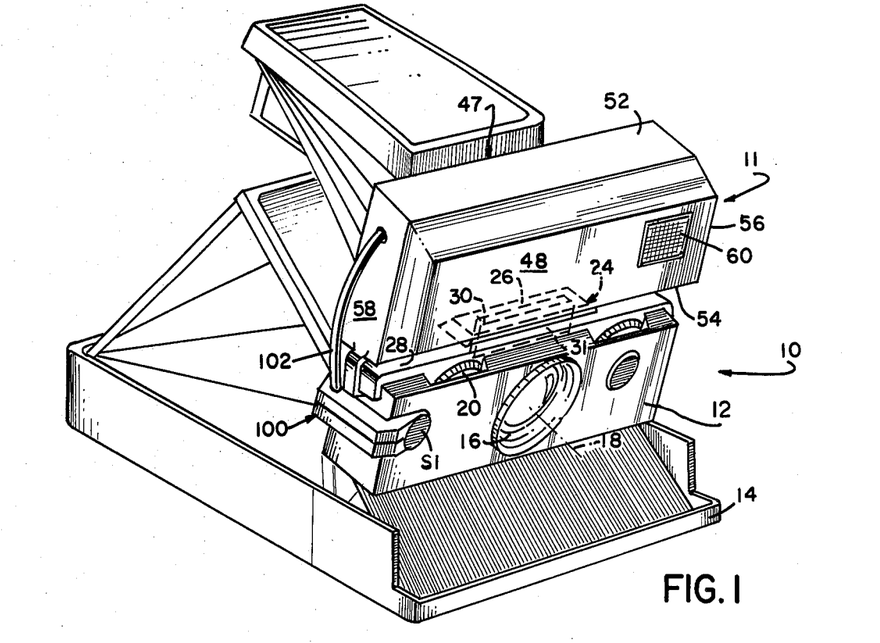
FIG. 1 is a perspective view of an electronic flash unit embodying the switch control apparatus of this invention attached to a camera.
Figure 2:
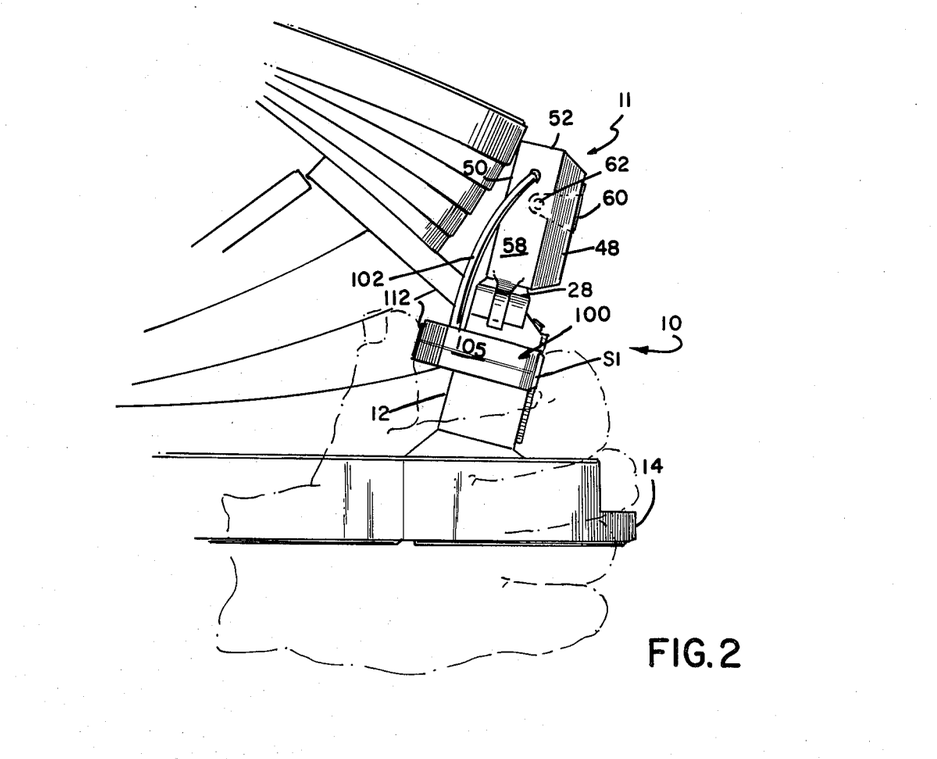
FIG. 2 is a side elevation view of the electronic flash unit and camera of FIG. 1.
Figure 3:
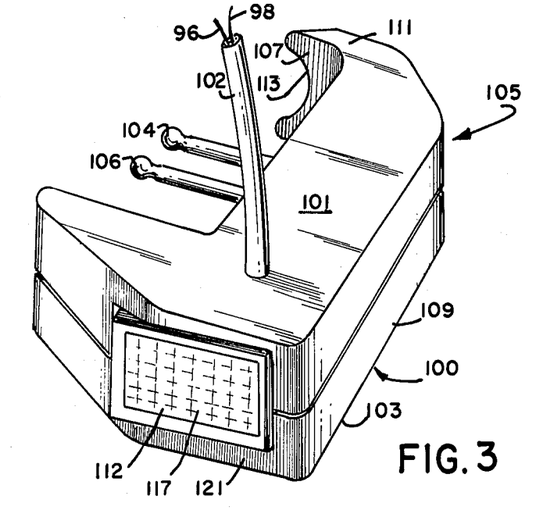
FIG. 3 is a perspective view of the switch control apparatus of the invention attachable to the flash unit and camera of FIG. 1.
Figure 4:
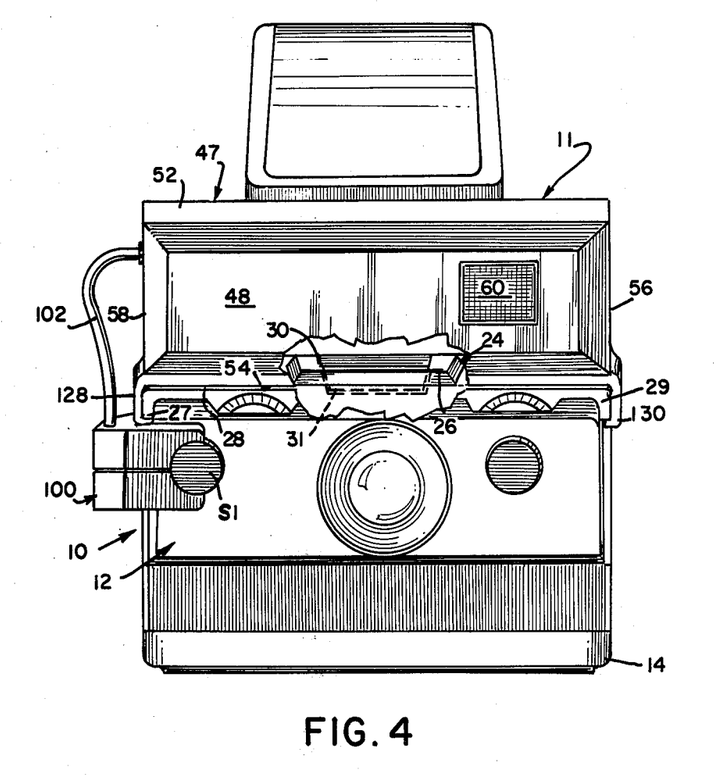
FIG. 4 is a front elevation view of the electronic flash unit and camera of FIG. 1.

Referring now to FIGS. 1, 2 and 3, there is shown a folding Polaroid SX-70 Land Camera 10 including a shutter or exposure control housing section 12 mounted to pivot into a face down position on a base housing section 14, when the camera is folded for storage, as shown in FIGS. 1, 2 and 4. The camera 10 is of the type more fully shown and described in U.S. Pat. No. 3,820,128 by J. Burgarella et al., entitled "Flat Photographic Control System", issued June 25, 1974 and assigned in common herewith.

The Housing Section 12 includes a lens and shutter assembly 16, which may be of the type shown in U.S. Pat. No. 3,820,128 supra, having a picture-taking axis 18, a focus wheel 20, for focusing the lens and a button S1 for initiating the exposure cycle of the camera, as shown in FIG. 1. Housing section 12 further includes a flash socket assembly 24, as shown in FIGS. 1 and 4, the details of which are more fully described in U.S. Pat. No. 3,754,643, entitled "Photoflash Apparatus" by J. Burgarella, issued Sept. 11, 1973, in common assignment herewith.

The flash socket assembly 24 functions in a well known manner as connecting apparatus for accomodating the removable fixed connection of an electronic flash or strobe unit 11 with the camera 10, as shown in FIGS. 1 and 4. The flash socket assembly 24, in its preferred mode, includes a boss 26 which extends from a wall 28 of the shutter housing section 12 and defines an entrance slot 30 which is generally orthogonal to picture taking axis 18 for accommodating receipt of a connector blade 31 from the strobe unit 11 as shown in FIG. 4. In the preferred mode, wall 28 further includes overhanging side portions 27 and 29 at the opposite ends thereof for reasons which will become more apparent from the following discussion.

Figure 5:
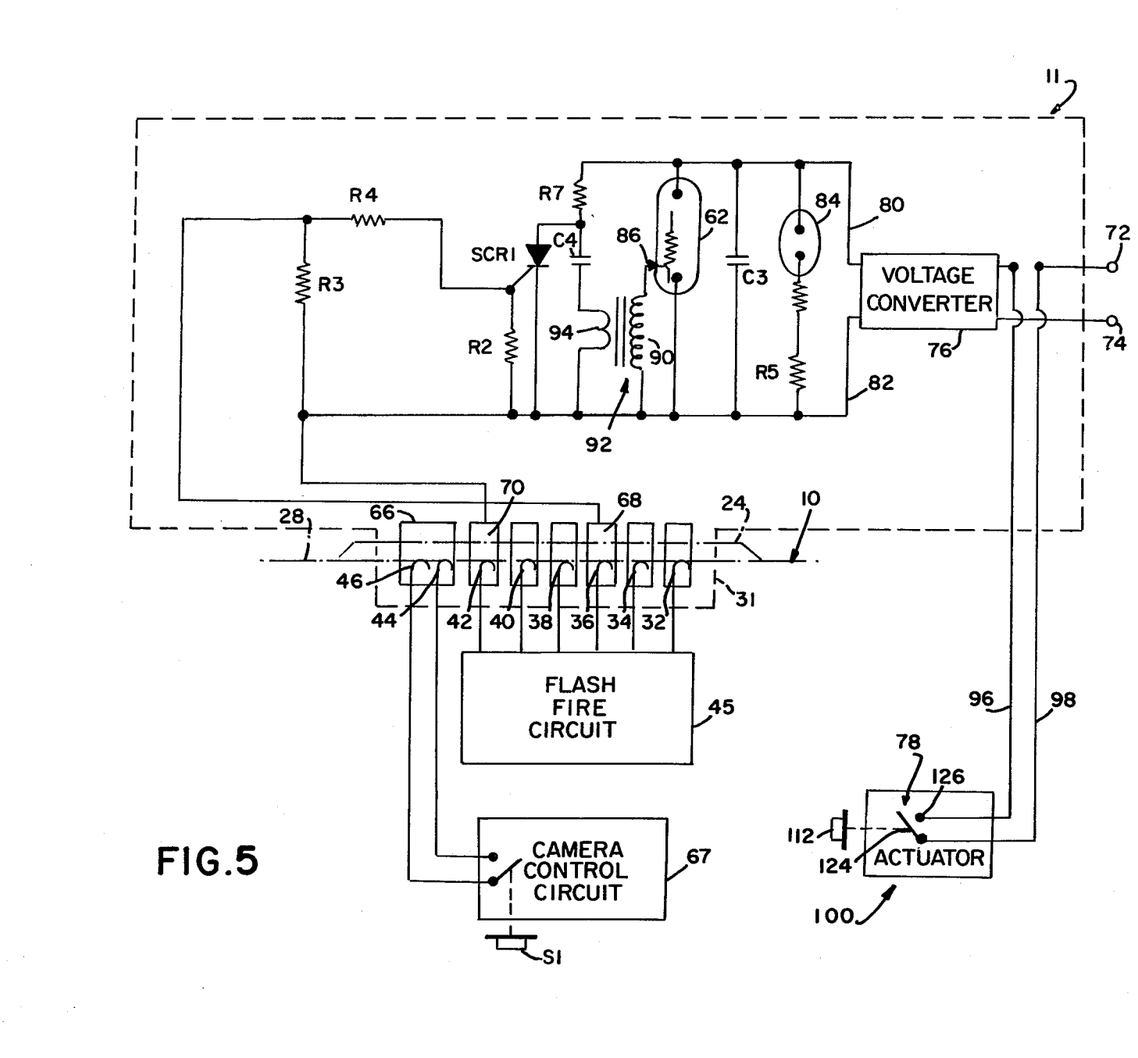
FIG. 5 is a schematic diagram of the electronic circuit of the electronic flash unit and camera of FIG. 1.

The flash socket assembly 24 further includes a first set of spaced apart contacts or terminal strips 32, 34, 36, 38, 40 and 42, and a second set of spaced apart contacts or terminal strips 44 and 46, as shown in FIG. 5. The terminal strips 32-34, in turn, are connected to a flash fire circuit shown generally at 45 as is more fully described in U.S. Pat. No. 3,858,227 entitled "Adapter Apparatus for Flash Firing System", by S. Ellen et al., issued Dec. 31, 1974 in common assignment herewith.

The flash unit 11 comprises a parallelepiped housing 47 having a generally planar front wall member 48 in spaced apart generally parallel relation to a back well member 50, as shown in FIGS. 1, 2 and 4. The front and back wall members 48 and 50 are peripherally connected respectively by generally planar, spaced apart, parallel top and bottom wall members 52 and 54 together with generally planar, spaced apart, parallel side wall members 56 and 58, as shown in FIGS. 1, 2 and 4. Front wall member 48 includes a transparent window 60 behind which is stationed an electronic flashtube 62 as shown in FIGS. 2 and 4, which functions in a well-known manner. The connector blade 31 extends downwardly from the bottom wall member 54 to provide means for physically connecting to the flash socket assembly 24, as shown in FIG. 4. Thus insertion of the connector blade 31 into the flash socket assembly 24, as shown in FIGS. 1 and 4, provides for the releasably fixed connection of the flash unit 11 to the camera 10.

The connector blade 31 is provided with a relatively wide terminal 66 that bridges the pair of terminal strips 44 and 46 upon insertion of the connector blade 31 within the socket assembly 24, as shown in FIG. 5. Electrically shorting terminal strips 44 and 46 operates to signal a camera control circuit, as shown generally at 67, that the flash unit 11 is in position in the camera and ready to be used in a manner as is more fully described in U.S. Pat. No. 3,757,643 supra. Electrical connecting means comprising two additional terminals 68 and 70 are also provided on the connector blade 31, as shown in FIG. 5, for making respective electrical contact with terminal strips 36 and 42 thereby facilitating receipt by the flash unit 11 of a flash fire trigger signal from the flash fire circuit 45 of the camera 10.

Terminals 68 and 70 on connector blade 31 connect respectively to the opposite sides of a resistor R3, as shown in FIG. 5, which corresponds to the impedance of an unfired flashlamp for reasons which are more fully apparent in U.S. Pat. No. 3,858,227 supra. Thus, resistor R3 preferably has a value on the order of 4 ohms, approximating the resistance of a flashlamp before it is fired. A current limiting resistor R4 and a gate resistor R2 are connected in parallel with the resistor R3.

The flash unit 11 is also adapted to receive an external substantially steady state DC voltage by way of a pair of output terminals 72 and 74 for powering a conventional voltage converter 76 as shown in FIG. 5. There is also provided an on/off switch 78 connecting to conductors or leads 96 and 98 by which the user may control the power connection to the voltage converter 76 in the manner of this invention to be subsequently described in detail herein. The voltage converter 76 operates in a conventional manner to convert the DC voltage, as can be derived from a battery (not shown), which is preferably 6 volts and located within the camera 10, to a suitable flash operating voltage such as 350 volts. This voltage appears on a pair of output conductors 80 and 82 from the voltage converter 76.

A first circuit path across the output conductors 80 and 82 includes a ready light 84 and a resistor R5 in series therewith, as shown in FIG. 5. The ready light 84 can be a conventional gas discharge lamp of any suitable design. The resistor R5 is selected to limit the current flowing through the lamp 84 to a suitable value. A second path across the conductors 80 and 82 comprises a storage capacitor C3 in a suitable size for storage of the energy necessary to fire the flash discharge tube 62. The discharge tube 62 has electrodes connected across the output conductors 80 and 82 in a third path. The tube 62 can be triggered to produce a flash of light when the capacitor C3 is sufficiently charged to allow the lamp 84 to glow and a relatively high voltage spike, such as 5,000 volts, is applied to the grid terminal 86 of the tube 62.

The grid 86 is connected to the output conductor 82 through the high voltage secondary winding 90 of a pulse transformer generally designated at 92 as shown in FIG. 5. The low voltage primary winding 94 of the transformer 92 has one terminal connected to the conductor 82 and a second terminal connecting through a capacitor C4, in series with a resistor R7, to the conductor 80. A silicon controlled rectifier, SCR1, has its anode terminal connected to the junction of the resistor R7 and the capacitor C4 and its cathode terminal connected to the conductor 82. Resistor R2 is connected between the gate and the cathode of the silicon controlled rectifier SCR1 to prevent false triggering of the controlled rectifier.

In order that the strobe unit be made as compact as possible, it may be desired that the voltage converter 76 be powered directly from a battery within the camera 10 in a manner as is more fully described in a copending application for U.S. Pat. Ser. No. 679,698 now U.S. Pat. No. 4,074,295 entitled "Compact Accessor Strobe For A Camera With Battery Enclosed Film Pack" by R. Kee filed Apr. 23, 1976 in common assignment herewith.

The on-off switch 78, by which the user of the flash unit 11 can control the voltage applied to the voltage converter 76, as shown in FIG. 5, is controlled by a switch actuator 100, which is shown in FIGS. 1 to 6. The switch actuator 100 includes a switch housing 105 and two (non-conducting) support probes or prongs 104 and 106 extending therefrom, as shown in FIG. 3, which fit with close clearance into matching receptacles (in the camera 10), shown in phantom in FIG. 6, for removeably mounting such switch actuator 100 thereon, as shown in FIGS. 1, 2 and 4.

Figure 6:
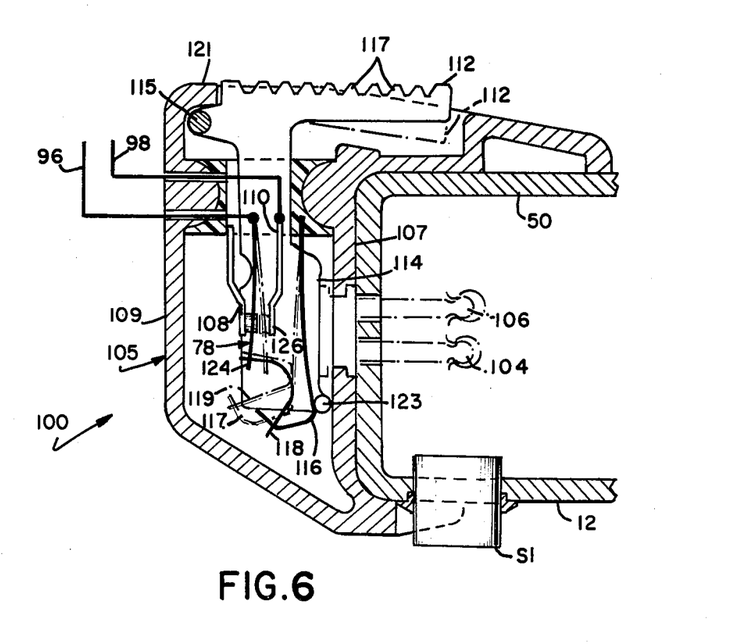
FIG. 6 is a cross-sectional plan view, partially schematic, of the switch control apparatus of FIG. 3.

The switch housing 105, is generally L-shaped, having a top wall 101, a bottom wall 103, an inner side wall 107, which contours to the camera housing and an outer side wall 109, as shown in FIGS. 3 and 6. Further, the switch housing 105 terminates in a tapered portion 111 which has a crescent cut-out portion 113 therein so as to contour with and permit access to the photographic cycle initiating button S1, as shown in FIGS. 3, 4 and 6. The switch housing 105 further has an apertured rear wall 121, in which is pivotably mounted a charging control means comprising manual push button 112, more fully described below, which has a surface of hand-engaging prismatic projections 117, arranged in a grooved grid, as shown in FIG. 3.

The switch actuator 100 has mounted therein, a single pole, double-throw switch 78, which includes a resilient leaf member 124 connected to conductor 96. The leaf member 124 when in its open position rests against an unused or dead pole 108 from which it can be pivoted into a closed position against a contact 126 of a live pole 110, which connects with conductor 98, as shown in FIG. 6. The switch conductors 96 and 98 connect the switch actuator 100 to the voltage converter 76 in the flash unit housing 11, as previously described, and are enclosed in an insulating covering 102, as shown e.g. in FIGS. 3, 4 and 6.

The manual push button 112 is pivotally mounted within the housing 105 and includes a lever arm 114 supported by a pivot pin 115, in the housing 105, as shown in FIG. 6. Mounted within the housing 105 adjacent the lever arm 114 of the push button 112, is a resilient hook-shaped leaf spring 116 which pivotally connects to a torsion spring 118, which in turn, connects to the resilient leaf member 124, as shown in FIG. 6. The lever arm 114 includes a pin 123 extending laterally outward therefrom for drivably engaging the leaf spring 116 in a manner to be subsequently described.

The strobe or flash unit 11 can be used in conjunction with the camera 10 in the following manner. The connector blade 31 from strobe 11 is first inserted in the usual manner within the flash socket assembly 24 thereby establishing a removable fixed connection between the flash unit 11 and camera 10. The switch actuator 100 can then be mounted on the camera 10 by inserting the probes 104 and 106 into matching receptacles in the camera 10, as shown in FIGS. 3 and 6. The switch actuator can be mounted on the camera 10 before the flash unit is mounted thereon, if desired.

Polaroid SX-70 type Land cameras are held in a normally expected manner by the photographer who grasps the underlying surface of the base housing section 14 in the palm of his hand while engaging the opposed sides of the base housing section 14 with his thumb and fingers respectively. The photographer can then bring his camera-operating hand into operational position on the camera 10, as shown in FIG. 2.

The photographer then uses the thumb of his camera operating hand (see FIG. 2) to push the push button 112 into the switch housing 105, which movement operates to pivot the lever arm 114 and its associated pin 123 in a known manner to drive the hook-shaped spring leaf 116 toward the switch 78 so as to compress and partially rotate the bowspring 118 thereby throwing the leaf member 124 from the dead pole 108 to the contact 126 of the live pole 110 as shown in phantom in FIG. 6. The switch 78 is thus closed to complete the circuit between the conductors 98 and 96, to apply supply voltage to the voltage converter 76 and charge the storage capacitor C3 of the flash tube 62, shown in FIG. 5.

When the push button 112 is pushed into the housing 105, the lever arm 114, in moving toward the switch 78, bends the resilient hook leaf spring 116, and compresses the bow spring 118 in a manner which causes the springs 116 and 118 to exert a continuous resilient yieldable bias against the lever arm 114. Accordingly, upon release of the push button 112 by the thumb of the photographer, the bow spring 118 opens and the hook spring 116 springs back to its original position, pushing the lever arm 114 and thus the push button 112 back to its normally open position, thereby opening the switch 78 and pushing the resilient leaf member 124 back against the dead pole 108, as shown in solid lines in FIG. 6. The switch 78, upon opening, disconnects the conductors 96 and 98, and terminates the voltage applied to the voltage converter 76 shown in FIG. 5, until the push button 112 is again operated.

Thus, in operating the camera and flash unit, the camera and flash unit are supported in the palm of the photographer's left hand if the photographer is right handed, and the photographer prepares to take a photographer e.g. as shown in FIG. 2, by first moving his right hand into position for normal operation of the camera 10 and the flash unit 11 and then applying his thumb to the push button 112 of the switch actuator 100 which, as previously described, applies voltage to the voltage converter 76 and charges the storage capacitor C3 of the flash tube 62.

Once the push button and switch 78 are closed in the aforementioned manner, the photographer must wait for the voltage converter 76 to charge the storage capacitor C3 to its prescribed value as indicated by the ready light 84 shown in FIG. 5, being lit.

When such capacitor charging is completed, the photographer can, without changing the general position of his hand, immediately press the photographic cycle initiating button S1 with his forefinger to operate the camera and the flash unit to take the desired photograph.

During the exposure interval, the flash fire circuit 45, as shown in FIG. 5, provides an appropriate flash fire trigger signal to the terminals 68 and 70 which causes a current to flow through the resistors R3 in parallel with R2 and R4 so as to gate the silicon controlled rectifier SCR1 into conduction. Assuming that the capacitors C3 and C4 are charged as previously discussed, with the SCR1 conducting, the capacitor C4 will discharge, causing the pulse transformer 92 to gate the flash tube 62 into conduction to produce a light flash.

As soon as the above-mentioned photographic cycle is completed, the photographer can release the thumb pressure applied to the push button 112, shown in FIG. 2, which permits the switch 78, shown in FIG. 6, to spring to its normally open condition and cease further current drain on the camera battery to conserve the same until it is desired to repeat the above cycle to take another photograph.

The electronic flash switch actuator 100 of the present invention is thus desirably mounted on the camera so that the push button 112 is readily reachable by the photographer's camera-operating hand when such hand is in a normal position to operate the photographic cycle initiating button S1 of the camera. Advantageously, the push button 112 is located on the switch actuator 100 so as to be reachable by the thumb of the photographer's camera-operating hand, when such hand is in a normal position for the photographer to make use of his forefinger to push the photographic cycle initiating button S1 of the camera, thereby utilizing a natural thumb-forefinger cooperation to control respectively the electronic flash and camera. Mounting the switch actuator 100 on the camera, in close proximity with the photographic cycle initiating button S1 so that the push button 112 is positioned rearwardly with respect to the photographic cycle initiating button S1, e.g. as shown in FIG. 2 thereby enables the photographer to utilize the natural opposite movement of the thumb and forefinger of his camera-operating hand, to operate respectively the electronic flash and photographic cycle initiating button S1 of the camera.

From the operation of the switch actuator embodying the invention, it is evident that positive action is required by the photographer's camera-operating hand to close and operate the capacitor charging circuit. Such circuit is not likely to be closed with the resulting current drain on the camera battery, either inadvertently or in a prolonged manner, in picking up such camera and flash unit in the usual manner.

Prevention of such unnecessary battery discharge is particularly critical when the strobe unit 11 is adapted to receive charging current from a battery situated within the folding camera 10, as more fully discussed in an application for U.S. Patent, Ser. No. 679,698 supra. Such a battery would be of the type which is carried in a Polaroid SX-70 Land film pack as manufactured and sold for use in the Polaroid SX-70 Land Camera.

In the preferred embodiment, the means for physically connecting the flash unit 11 to the camera 10 in a releasable manner may additionally include a pair of spaced apart, resilient, C-type clips 128, 130 which are adapted to resiliently engage respective overhanging side portions 27 and 29 of the wall member 28, as shown in FIG. 4. Resilient clip 128 may additionally include a cantilevered portion 132 extending laterally outward therefrom to accommodate engagement by a user in an upward direction in a manner operating to deflect the C-type clip 128 out of engagement with the overhanging side portion 27. The overhanging side portions 27 and 29 may thus form part of the connecting apparatus which permits the removable fixed connection of the flash unit 11 with respect to the camera 10.

Wherein the camera 10 is herein described as being a Polaroid SX-70 Land Camera 10, it will be readily understood that the invention is by no means so limited and may be applicable to other cameras such as Polaroid's most recently introduced Pronto Camera which also utilizes Polaroid's SX-70 type film.

In addition, the flash unit 11 need not be detachable from the camera 10 as exemplified above, but can be integral therewith including the switch actuator embodying the present invention.

The switch actuator of the invention, can as illustrated in FIG. 4, be fixedly and removeably attached to the camera housing and the wire 102, connecting the switch actuator to the flash unit can be attached to such switch actuator at one end and attached to the flash unit at the other end, permanently or releaseably as desired. Further, the switch actuator of the invention can be permanently attached to a camera while the wires or other conductive means to the flash unit can be releaseably attached thereto. Where the flash unit and camera are permanently attached, the switch actuator can also be permanently (or releaseably) attached to such camera and flash unit respectively. Further, such connecting wires or other conductor can be connected within the respective camera and flash unit housings were desired, within the scope of the invention.

Although a known type of microswitch within the switch actuator has been disclosed herein e.g. in FIG. 6, it will be recognized that various other switch closing and opening means can be employed within the scope of the present invention. For example, the push button can be replaced by a toggle switch or other lever means within the scope of the present invention. In addition, the opening means can include other resilient means, e.g. the push button can be connected to work against a helical spring.

The switch actuator including the switch housing can be permanently or releaseably mounted on the camera, the flash unit or the combined camera and flash apparatus, within the scope of this invention, provided such switch actuator is mounted so as to be readily reachable by the camera-operating hand of the user when it is in a normal position to operate the camera. Further, the switch housing can be dispensed with and the switch actuator can be mounted as above stated. Preferably, however, the switch actuator with or without the switch housing, is mountable to a camera as previously described.

Therefore, since certain changes may be made in the above described system and apparatus without departing from the scope of the invention herein involved, it is intended that all matter contained in the description thereof, or shown in the accompanying drawings shall be interpreted as illustrative and not in a limiting sense.

What is claimed is:

1. An electronic flash unit for use with a camera of the type which the photographer would normally hold in one hand and operate with his other hand and which includes a photographic exposure cycle initiating button together with means for providing a flash fire trigger signal at an appropriate time during the photographic exposure interval together with connecting apparatus for accommodating the removable fixed connection of said flash unit with respect to the camera, said flash unit comprising:
   a first housing;
   a storage capacitor;
   a flash discharge tube;
   means responsive to an applied voltage for charging said capacitor;
   circuit means responsive to the trigger signal for discharging said capacitor through said discharge tube to produce an illuminating flash of light;
   electrical connecting means for facilitating the electrical connection of said circuit means to the trigger signal providing means of the camera;
   physical connecting means complementary to the camera connecting apparatus for facilitating the releasable fixed connection of said flash unit housing to the camera; p1 an actuator assembly comprising: an electric switch connectable to a source of electrical energy for controlling the application of electrical energy to said capacitor charging means, means for connecting said switch to said capacitor charging means, an actuator member mounted for manual displacement from a first position to a second position and operatively associated with said switch so as to move said switch from an open condition so as not to apply electrical energy to said capacitor charging means, to a closed condition so as to apply electrical energy to said capacitor charging means when said actuator is moved from its said first position to said second position, resilient means for yieldably biasing said actuator member to move from its said second position back to its said first position, means for facilitating the releasable fixed connection of said actuator assembly to the camera so as to locate said actuator member in closely spaced apart relation with respect to the camera photographic cycle initiating button thereby enabling the photograher to first apply electrical energy to said capacitor charging means by moving said actuator member from its said first position to its said second position with the thumb of his camera operating hand and to thereafter, without substantially changing the position of his camera operating hand initiate a photographic exposure cycle by actuating the photographic cycle initiating button with the forefinger of his same camera operating hand.

2. The electronic flash of claim 1 wherein the camera further includes means for receiving and connecting to the source of electrical energy to derive power therefrom together with means for providing at least a portion of the derived power to contacts available from outside the camera, and said flash unit electrical connecting means includes means for facilitating the electrical connection of said circuit means, and said charging means to the camera energy supply contacts by way of said switch.

3. The electronic flash of claim 2 wherein the camera includes an exposure control housing having a forward wall on which is supported the photographic cycle initiating button and a rearward wall spaced closely apart behind the forward wall and an objective lens disposed on the forward wall, and wherein said actuator assembly is arranged when connected to the camera to position said actuator member behind the rearward wall for movement from its said first to its said second position along a direction generally parallel and opposite to the direction of actuation of the photographic cycle initiating button thereby enabling the photographer to utilize the natural opposite movement of the thumb and forefinger of his camera operating hand to actuate respectively the electronic flash and photographic cycle initiating button of the camera.

4. The electronic flash of claims 2 or 3 wherein said actuator assembly further comprises a second housing together with elongated leads extending from said switch and out of said first housing to said second housing to accommodate the remote stationing of said second housing with respect to said first housing.

5. The electronic flash of claim 4 wherein the camera exposure control housing includes a sidewall between the forward and rearward walls together with a socket therein and the actuation assembly includes at least one prong member for releasable insertion within the socket.

6. The electronic flash of claim 5 wherein the actuator assembly housing includes a plurality of wall portions which are complementary to respective portions of the exposure control housing forward, side and rearward walls without obstructing access to the photographic exposure cycle initiating button.

7. A photographic camera and electronic flash apparatus of the type which the photographer would normally hold in one hand and operate with his other hand, said camera and flash apparatus comprising:

means for housing said camera and flash apparatus, including a forward wall and a rearward wall spaced closely apart behind said forward wall;

an objective lens;

a photographic exposure cycle initiating button supported by said forward wall;

means responsive to the actuation of said button for conducting a photographic exposure cycle, including means for providing a flash fire trigger signal at an appropriate time during the photographic exposure cycle;

a storage capacitor;

a flash discharge tube;

means responsive to an applied voltage for charging said capacitor;

circuit means responsive to said trigger signal for discharging said capacitor through said discharge tube to provide an illuminating flash of light;

an electric switch connectable to a source of electrical energy for controlling the application of energy to said capacitor charging means;

means for connecting said switch to said capacitor charging means; and flash actuator means for controlling the closure of said electric switch, said actuator means comprising an actuator member, means for mounting said actuator member for manual displacement from a first position to a second position whereby said actuator member is operatively associated with said switch so as to move said switch from an open condition so as not to apply electrical energy to said capacitor charging means, to a closed condition so as to apply electrical energy to said capacitor charging means when said actuator member is moved from its said first position to its said second position, resilient means for yieldably biasing said actuator member to move from its said second position back to its said first position, said means for displaceably mounting said actuator member further operating to mount said actuator member behind said rearward wall for movement from its said first to its said second position along a direction generally parallel and opposite to the direction of actuation of the camera photographic cycle initiating button thereby enabling the photographer to first apply electrical energy to said capacitor charging means by moving said actuator member from its said first position to its said second position with the thumb of his camera-operating hand and to thereafter without substantially changing the position of his camera-operating hand initiate a photographic exposure cycle by actuating the photographic cycle initiating button with the forefinger of his same camera-operating hand thereby enabling the photographer to utilize the natural opposite movement of the thumb and forefinger of his camera-operating hand to actuate respectively the electronic flash and photographic cycle initiation button of the camera.

8. The camera and flash apparatus of claim 7 including means for receiving and connecting said switch to the source of electrical energy to derive power therefrom together with means for providing at least a portion of the derived power to said circuit means, and said charging means by way of said switch.

* * * * *

UNITED STATES PATENT AND TRADEMARK OFFICE
CERTIFICATE OF CORRECTION

PATENT NO. : 4,285,589
DATED : August 25, 1981
INVENTOR(S) : David Van Allen, Fred M. Finnemore It is certified that error appears in the above-identified patent and that said Letters Patent are hereby corrected as shown below:

In the Claims:

Column 9, line 58, cancel "pl".

Signed and Sealed this

Twenty-seventh Day of October 1981

[SEAL]

Attest:

GERALD J. MOSSINGHOFF

Attesting Officer     Commissioner of Patents and Trademarks